June 27, 1939.    P. LUTERAAN    2,164,139
OPTICAL BALANCE
Filed June 6, 1936    2 Sheets-Sheet 1

INVENTOR:
PHILIP LUTERAAN
BY: Francis E. Boyce
ATTORNEY

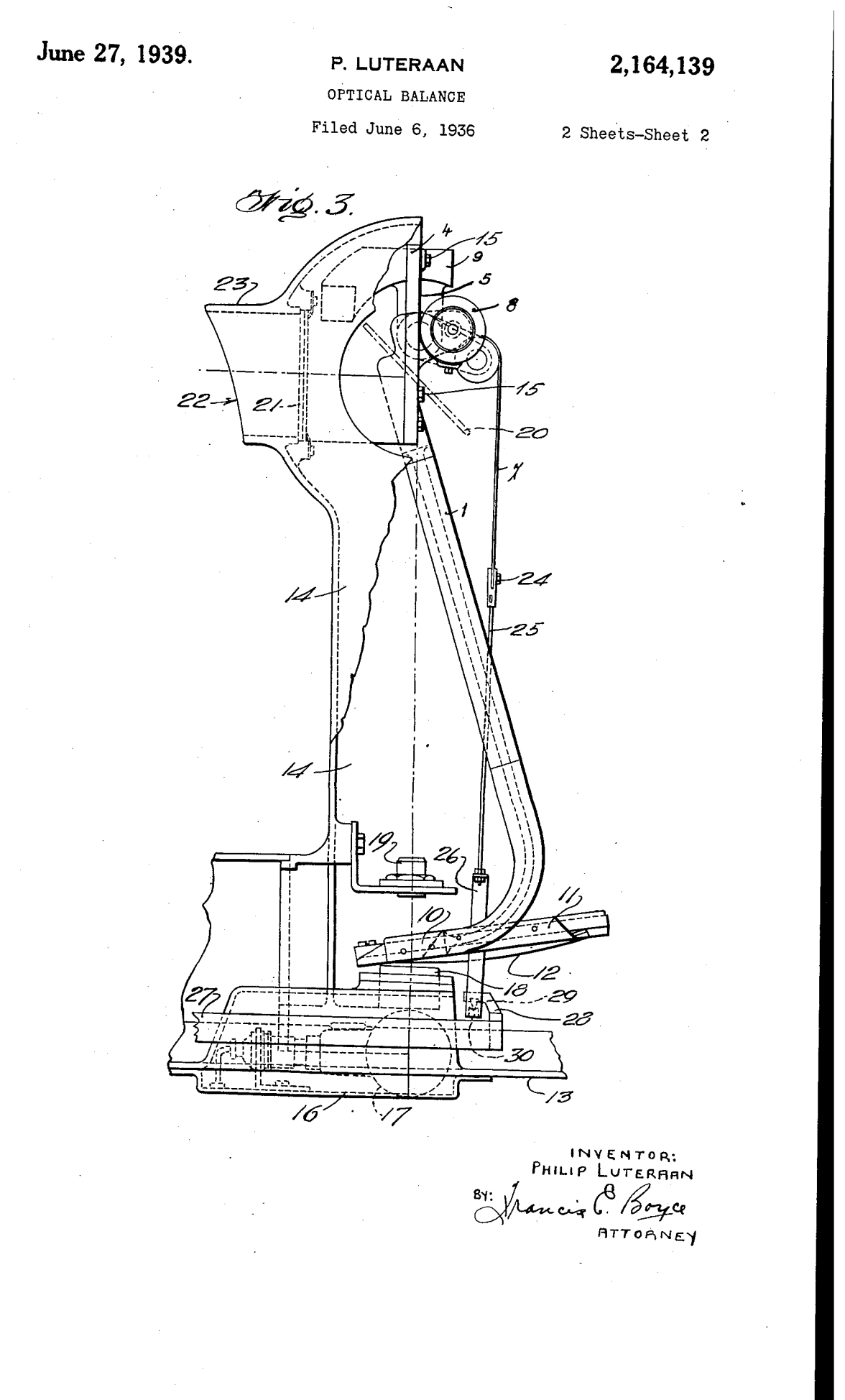

June 27, 1939.    P. LUTERAAN    2,164,139
OPTICAL BALANCE
Filed June 6, 1936    2 Sheets-Sheet 2

Fig. 3.

INVENTOR:
PHILIP LUTERAAN
BY: Francis E. Boyce
ATTORNEY

Patented June 27, 1939

2,164,139

UNITED STATES PATENT OFFICE 2,164,139

OPTICAL BALANCE

Philip Luteraan, Bagnolet, France

Application June 6, 1936, Serial No. 83,903
In France December 10, 1935

3 Claims. (Cl. 265—62)

In this application the pendular gear which moves the dial of optical balances is carried by knives resting on bearings. The latter are provided with V-shaped supporting parts made of hard stone (agate for instance) or of a special polished steel.

When hard stone is used, the constancy of the characteristics of the balance is conditional upon the duration of resistance of the brilliant polish with which the faces of the V-shaped parts are provided. When said polish vanishes, the stone wears out and will act as an abrasive upon the edge of the knife which becomes blunt. The axis of suspension of the gear descends at the same time as the resistance to the angular displacements increases.

In case the supporting part is made of polished special steel, it will be impossible to obtain a fair edge at the intersection of the slanting faces of the V-shaped parts. The knife is therefore combined with a cylindrical junction surface along which its edge is intended to move during the pendular weighing motions. In this embodiment, therefore the axis of suspension of the gear moves horizontally on either side of its theoretical point or axis. The so called parasitical motions, of small amplitude, have however considerable importance in the case of an optical balance, due to the magnifying effect to which the luminous projection of the reading scale is subjected, the said projection increasing in the same proportion as the variations in the position of the gauges of the said scale.

The present invention refers to an improvement in mounting the pendular gear of optical balances, for the purpose of doing away with the above mentioned disadvantages. To this effect, the said pendular gear is suspended to flexible or yielding metal bands each secured, by one of its ends, to a vertical guide way along which it hangs, the other ends of the bands being secured to cams oscillating with the oscillations of the pendular gear and maintaining the said yielding bands constantly pressed against the corresponding guide ways.

The said combination produces the following results:

(a) The sensitiveness of the mechanism is increased and the wear of the other suspension members is eliminated.

(b) All side play is suppressed so that the image reflected upon the ground glass is not subject to any horizontal translating motion.

In the accompanying drawings illustrating two embodiments of the invention and in which like characters of reference indicate like parts in the several views:

Fig. 3 is a fragmentary side elevation of a scale or balance wherein this invention is utilized.

Figure 1:
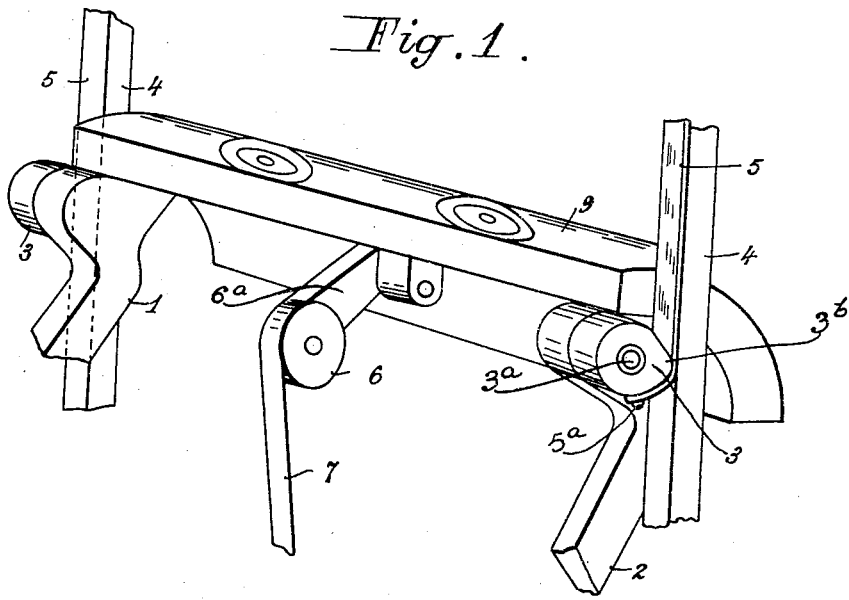
Fig. 1 is a perspective view of one form of the suspension means for an optical balance as constructed in accordance with this invention.
Figure 2:
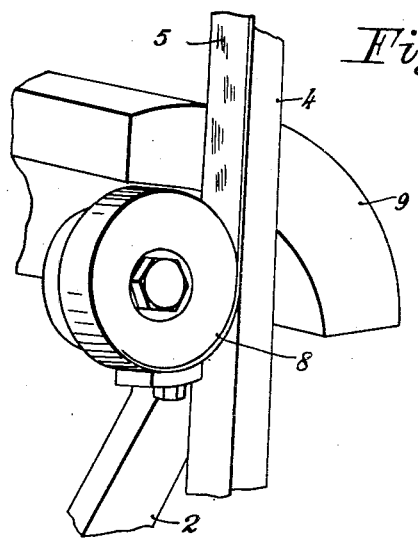
Fig. 2 is a modified form of construction wherein the cams are of cylindrical shape.

In Fig. 1, 1 and 2 denote the upper parts of the rigid frame carrying the movable transparent dial common to balances of this kind.

The pendular mass or body formed by this frame and the transparent dial tends to bear, through the cams 3, against the front faces of the vertical guide ways 4, the suspension being secured through the flexible metal bands 5 which are interposed between the cams and guide ways. Each of the bands 5 has its upper end secured to a guide way 4 above the respective cam and has its lower end wrapped partly around the under side of the cam and there secured as at 5a. The upper ends of the members 1 and 2 are fixedly connected by a transverse member 9 preferably constructed to form a counterbalance and the cams 3 are fixed to the members 1 and 2 as at 3a. These cams 3 are here shown as having sub-acute edge portions 3b which rest on the bands 5.

The load actuated cam 6 is provided with a band 7 which is fixed to the cam and extends over the upper peripheral portion to pass down in front of this cam and down to have connection with the lower load actuated mechanism to which it is preferably connected by the usual knife and bearing either directly or by means of a rigid connecting rod, neither the knife and bearing nor the rigid connecting rod being shown in Fig. 1. The cam 6 is fixed to an arm 6a which is in turn fixed to the member 9 so that depression of the cam 6 will rock the counterweight upwardly.

Fig. 2 shows modified form of construction with well rounded contacts, the cams being of cylindrical shape.

In this form the cams 3 of Fig. 1 are replaced by rollers 8 fixed to arms 1 and 2 connected to the pendular body or counterweight 9.

It will be observed that in each case the bands 5 extend along the flat guide ways 4 and that the cams 3 and 8 roll on these bands and thus vertically on the flat guide ways against which they are held at all times by the downward stress on the band 7 which is carried by a cam on arm projecting well in front of the guide ways 4.

As shown in Fig. 3, the arm 1 extends downwardly and then forwardly at 10, the arm 2 (not shown) conforming in shape to arm 1. Between the forward ends 10 of the arms 1 and 2 there is mounted a frame 11 carrying an arcuately curved scale glass 12 of the usual construction and character. The scale base 13 is provided with upstanding frame members 14 whereto the bars 4 are secured as by holdfast means 15. In the base 13 is a housing 16 wherein is mounted an electric lamp 17 in vertical alignment with an optical system including a condenser 18 and a projecting lens 19, the scale glass 12 being arranged to swing between the condenser and projecting lens. A reflecting mirror 20 is aligned vertically above the projecting lens and is set at an angle of 45° to the optical axis of the projecting lens and condenser whereby light from the lamp is reflected forwardly onto the ground glass reading screen or view plate so that the projected image of the graduations of the scale glass 12 may be observed through the open front end 22 of the housing 23 wherein the view plate is located.

The tape or band 7 has its lower end connected at 24 to a bar 25 carrying at its lower end a stirrup 26. A portion of a scale beam is shown at 27 and a bracket 28 is fixed upon the rear end of the beam 27 to extend upwardly and forwardly into the stirrup 26. A knife edge 29 is carried by the under side of the forward end of the bracket and engages a knife edge seat 30 carried by the stirrup 26.

The optical arrangement just described is not to be understood as part of the present invention which relates solely to the means for supporting the upper ends of the arms 1 and 2 and the tape or band 7, the object of the disclosure being merely to correlate the invention with the remainder of an optical balance. No claim is therefore made in this application to the arrangement of the optical system.

Obviously, vertical movement of the lever 27 will effect vertical movement of the tape or band 7 and this, in turn, will swing the arms 1 and 2 to bring the proper scale indication of the scale glass 12 into the optical axis so that the weight indicated may be read on the plate 21.

What I claim is:

1. Suspending and actuating device for the movable member carrying the indicating member of a balance, comprising a pendular body forming a counterweight, means rigidly fastened to said body for supporting the indicating member, an actuating cam fixed on said body, a flexible actuating band transmitting traction from the weighing mechanism of the balance to the pendular body, said actuating band passing on said actuating cam and being fixed to the same, two fixed vertical guide tracks, two suspension cams fixed to said pendular body, flexible suspension bands suspended to extend downwardly along said guide tracks, said bands passing under said suspension cams and being fixed to the same, said actuating band passing on the actuating cam on the side opposite to the side on which the suspension bands pass under the suspension cams, whereby the last mentioned cams and the suspension bands are held against the guide tracks by traction acting upon the actuating band.

2. Suspending and actuating device for the pendular body forming the counterbalancing member and carrying the movable dial of a balance, comprising two similar horizontally aligned suspending cams fixed to said pendular body, two fixed vertical guide tracks having their front faces in the same plane, flexible suspending bands suspended to extend downward against the front faces of said guide tracks, said suspending bands passing behind and under the said suspending cams and fixed thereto, an actuating cam fixed to said pendular body in front of the said plane passing through the guide tracks, and a flexible actuating band transmitting traction from the weighing mechanism of the balance to the pendular body, said actuating band passing in front of and over said actuating cam and being fixed to the same, so that the suspending cams and suspending bands are held against the guide tracks by the traction acting upon the actuating band.

3. A band suspension for the pendular body forming the counterbalancing member and carrying the movable dial of an optical balance, comprising two similar, horizontally aligned suspending cams fixed to the said pendular body and facing one direction, an actuating cam fixed to said pendular body and facing the opposite direction, two fixed vertical guides having their front faces in the same plane, flexible suspending bands suspended to extend downward against the front faces of said guides, said suspending bands passing under the said suspending cams and fixed thereto, and an actuating band transmitting traction from the weighing mechanism of the balance to the pendular body, said actuating band passing over said actuating cam and being fixed to the same, so that the suspending cams and bands are held against the guides by the traction transmitted by the actuating band.

PHILIP LUTERAAN.